UNITED STATES PATENT OFFICE.

JOSEPH DEINET, OF ELBERFELD, GERMANY, ASSIGNOR TO FARBENFABRIKEN VORM. FRIEDR. BAYER & CO., OF ELBERFELD, GERMANY, A CORPORATION OF GERMANY.

VAT DYE.

957,146.  Specification of Letters Patent.  Patented May 3, 1910.

No Drawing. Application filed May 15, 1909, Serial No. 496,110. Renewed March 18, 1910. Serial No. 550,293

*To all whom it may concern:*

Be it known that I, JOSEPH DEINET, citizen of the German Empire, residing at Elberfeld, Germany, have invented new and useful Improvements in Vat Dyes, of which the following is a specification.

My invention relates to the production of a new anthracene derivative. It is obtained by converting the 1-amino-4-oxyanthraquinone into its monobenzoylated derivative. The reaction is carried out by treating the 1-amino-4-oxyanthraquinone with benzoyl chlorid.

Example: 10 parts of 1-amino-4-oxyanthraquinone are heated to boiling for about half an hour with 100 parts of nitrobenzene and 20 parts of benzoyl chlorid. The new condensation product crystallizes from the cooling liquid in the shape of bronze-red shining leaflets which are filtered off and dried. It is soluble in pyridin with a yellow-red color, in concentrated sulfuric acid with a red color. By treatment with hydrosulfite and NaOH a yellow-red vat is obtained which dyes cotton, wool or silk bluish-red shades.

I claim:—

The herein described new vat dyestuff of the anthracene series which is the 1-benzoyl-amino-4-oxy-anthraquinone, which dyestuff is, after being dried and pulverized, a red powder which is soluble in pyridin with a yellow-red color; soluble in concentrated sulfuric acid with a red color; giving a yellow-red vat with hydrosulfite and caustic soda lye, which vat dyes the textile fiber bluish-red shades, substantially as described.

In testimony whereof I have hereunto set my hand in the presence of two subscribing witnesses.

JOSEPH DEINET. [L. S.]

Witnesses:
OTTO KÖNIG,
C. J. WRIGHT.